(12) United States Patent
Eyraud et al.

(10) Patent No.: US 8,756,352 B2
(45) Date of Patent: Jun. 17, 2014

(54) SYSTEM FOR MANAGING BUFFERS OF TIME-STAMPED EVENTS

(71) Applicant: Schneider Electric Industries SAS, Rueil Malmaison (FR)

(72) Inventors: Annick Eyraud, Antibes (FR); Philippe Wilhelm, Biot (FR); Jacques Piacibello, Antibes (FR)

(73) Assignee: Schneider Electric Industries SAS, Rueil Malmaison (FR)

(*) Notice: Subject to any disclaimer, the term of this patent is extended or adjusted under 35 U.S.C. 154(b) by 0 days.

(21) Appl. No.: 13/677,777

(22) Filed: Nov. 15, 2012

(65) Prior Publication Data
US 2013/0205052 A1  Aug. 8, 2013

(30) Foreign Application Priority Data

Nov. 28, 2011  (FR) ..................... 11 60845

(51) Int. Cl.
*G06F 3/00* (2006.01)
*G06F 5/00* (2006.01)

(52) U.S. Cl.
USPC ........................................... 710/57; 713/502

(58) Field of Classification Search
None
See application file for complete search history.

(56) References Cited

U.S. PATENT DOCUMENTS

| 7,840,285 | B2 * | 11/2010 | Wilson et al. ................ 700/11 |
| 8,326,666 | B2 * | 12/2012 | Caldwell et al. ............ 705/7.12 |
| 2006/0059270 | A1 * | 3/2006 | Pleasant et al. .............. 709/237 |
| 2007/0244571 | A1 | 10/2007 | Wilson et al. |
| 2011/0066598 | A1 * | 3/2011 | Wilson et al. ................ 707/661 |
| 2011/0093124 | A1 | 4/2011 | Berggren et al. |

FOREIGN PATENT DOCUMENTS

| EP | 0 585 479 A1 | 3/1994 |
| EP | 2 034 409 A1 | 3/2009 |
| EP | 2 312 719 A1 | 4/2011 |
| FR | 2 882 834 A1 | 9/2006 |

OTHER PUBLICATIONS

French Preliminary Search Report issued Feb. 21, 2012 in corresponding French Application No. 11 60845 filed Nov. 28, 2011 (with an English Translation of Categories).

* cited by examiner

*Primary Examiner* — Elias Mamo
(74) *Attorney, Agent, or Firm* — Oblon, Spivak, McClelland, Maier & Neustadt, L.L.P.

(57) ABSTRACT

A system for managing time-stamped events with uncertain events-sequence signalling, including a list of variables of which a change of value must lead to the detection of an event to be time-stamped and to be saved; means, for each variable, for positioning a marker indicating the quality of the time-stamping of said event; a buffer for the storage, before they are read by client software, of said events to be time-stamped and to be saved, associated respectively with a time-stamping time, said time-stamped events read by the client software being erased from the buffer; means for enabling and for disabling means for saving in a history the values of the variables corresponding to said time-stamped events that have been read.

9 Claims, 6 Drawing Sheets

| Messages | Time | Quality | Time-stamper | Accuracy | Equipment |
|---|---|---|---|---|---|
| Var1 - 0 | T1 | Time OK | Mod1 @192.168.2.1 | 1 ms | Breaker xx |
| Var2 - 1 | T2 | Time OK | Mod2 @192.168.2.2 | 10 ms | Breaker yy |
| Var1 - 0 | T3 | Time OK | Mod1 @192.168.2.1 | 1 ms | Breaker xx |
| Uncertain SOE - 1 | T4 | Time OK | Mod2 @192.168.2.2 | | |
| Var2 - 1 | T5 | Time Uncertain | Mod2 @192.168.2.2 | 10 ms | Breaker yy |
| Var2 - 0 | T7 | Time Uncertain | Mod2 @192.168.2.2 | 10 ms | Breaker yy |
| Uncertain SOE - 0 | T8 | Time OK | Mod2 @192.168.2.2 | | |
| Var1 - 1 | T9 | Time OK | Mod1 @192.168.2.1 | 1 ms | Breaker xx |

FIG. 1

SYSTEM FOR MANAGING BUFFERS OF TIME-STAMPED EVENTS

TECHNICAL FIELD OF THE INVENTION

The present invention relates to systems having devices for saving time-stamped events and, more accurately, relates to the management of such a system having a set of sources for detecting and time-stamping events each having a buffer for the saving before reading of said time-stamped events. Each buffer is designed to be read by remote client software which may then, for example, display the events on an alarms or events screen. One of the possible applications of the present invention relates to analysing the origin of a problem in a distributed system.

An example of a system having a set of sources of events to be time-stamped is shown in FIG. 2.

The system according to the invention makes it possible to sort time-stamped events chronologically. It also ensures that the values of the variables of each source are consistent with those seen by the client software even in particular situations, for example in the event of a full buffer, or of initialisation of one of the sources or of the client software. This function of guaranteeing consistency of values is carried out autonomously by said system without intervention of centralised intelligent software.

The system according to the invention also provides diagnostic means for the user. It makes it possible to signal uncertain sequences of events. An uncertain sequence of events, unlike a reliable sequence of events, is a sequence that is time-stamped uncertainly or during which sequences events have been able to be lost. It can also allow the detection of an invalid time-stamping, for example because of an invalid or unsynchronised clock.

FIG. 1 gives an example of information that can be communicated to the user by virtue of the system according to the invention.

PRIOR ART

According to the prior art, systems having devices for saving time-stamped events are managed by a software supervisor of which one of the functions consists in collecting the events that have occurred within the various hardware or software subsystems that comprise it. These events correspond to the detection of a change of value of variables belonging to a preconfigured list; they must be time-stamped accurately and sorted in chronological order.

In the prior art, the supervision software responsible for collecting and sorting all of the events that have occurred in the system is therefore constantly connected to the system and continuously or at regular intervals interrogates each buffer of each subassembly, in which buffers the events detected and time-stamped locally are temporarily stored, in each subassembly.

Document U.S.20110066598A1 describes an example of an architecture of a system having devices for saving time-stamped events. The teaching of this document does not make it possible to autonomously manage, by intrinsic means, all of the events detected and time-stamped in all of the system, notably in distinct subsystems, or to store them in an ascending chronological order. When a non-nominal operating mode occurs—reinitialisation, full buffer, etc.—, the system according to document U.S.20110066598A1 has no intrinsic means for managing this non-nominal operation. In this patent, the sorting of the events is carried out by the client software and not by the system autonomously.

Similarly, the method described in document FR2882834A1 does not include intrinsic means for managing non-nominal operating modes.

The object of the present invention is to alleviate this problem. Therefore, the system according to the invention provides a distributed system comprising means for detecting, time-stamping and saving events and intrinsic and autonomous means for managing this distributed time-stamping: these intrinsic means ensure the chronological sorting of the detected events and make it possible to manage the non-nominal operating modes, such as during a reinitialisation or when a buffer is completely full.

DESCRIPTION OF THE INVENTION

Accordingly, the subject of the invention is a system for managing time-stamped events with uncertain events-sequence signalling, comprising:
  a list of variables of which a change of value must lead to the detection of an event to be time-stamped and to be saved;
  means for detecting and time-stamping said events corresponding to said list of variables;
  means, for each variable, for positioning a marker indicating the quality of the time-stamping of said event;
  a buffer for the storage, before they are read by client software, of said events to be time-stamped and to be saved, associated respectively with a time-stamping time, said time-stamped events read by the client software being erased from the buffer;
  means for enabling and for disabling means for saving in a history the values of the variables corresponding to said time-stamped events that have been read;
  means for detecting a fill rate of said buffer exceeding a predefined fill threshold;
  means for detecting the presence of client software connected to the buffer to read the events that are present in said buffer.

The system according to the invention also comprises:
  a specific event of signalling an uncertain sequence of events set at 0 when the system must consider the sequence of subsequent events in the buffer to be valid, and set at 1 when the system must consider the sequence of subsequent events in the buffer to be invalid;
  means for switching to the value 1 of said specific event of signalling an uncertain sequence of events;
  means for switching to the value 0 of said specific event of signalling an uncertain sequence of events;
  and moreover, if the specific event of signalling an uncertain sequence of events is set at 1, the marker indicating the quality of the time-stamping is set at the uncertain value.

Advantageously, said system uses the means for switching to the value 1 of said specific event of signalling an uncertain sequence of events when the fill rate of the buffer becomes greater than or equal to the predefined fill threshold.

Advantageously, said system does not time-stamp an event when it detects no client software connected to the buffer to read the events that are present in said buffer.

Advantageously, the system according to the invention can use the means for switching to the value 0 of said specific event of signalling an uncertain sequence of events when client software is connected to the buffer to read the events that are present in said buffer and when the fill rate of the buffer becomes lower than the predefined fill threshold; moreover, if said specific event of signalling an uncertain sequence of events is set at 0:

the system uses the means for enabling the means for saving in the history the values of the variables corresponding to the time-stamped events that have been read;

the system uses means for enabling the means for detecting and for time-stamping the events corresponding to the list of variables;

the system associates each new saving of a time-stamped event in the history with a marker indicating that the time-stamping of said time-stamped event is certain.

Advantageously, if said specific event of signalling an uncertain sequence of events is set at 0, said new saving of a time-stamped event is carried out only if the value of the corresponding variable has changed relative to the last value of the same variable that is present in the history.

Advantageously, if the specific event of signalling an uncertain sequence of events is set at 1:

the system uses means for disabling the means for detecting events corresponding to the list of variables;

the system uses the means for disabling the means for saving in the history the values of the variables corresponding to the time-stamped events.

Advantageously, if the specific event of signalling an uncertain sequence of events is set at 1, and if an event that is present in the buffer is read by the client software and corresponds to a variable of which the value has changed relative to the last value of the same variable that is present in the history, said time-stamped event is saved in the history, associated with a marker indicating that the time-stamping of said time-stamped event is uncertain.

Advantageously, said buffer is the only buffer that is present in said system so that the time-stamped events that are stored therein are intrinsically sorted in an ascending chronological order of saving.

Advantageously, in a system according to the invention comprising a plurality of event sources, each of said event sources has a unique buffer.

BRIEF DESCRIPTION OF THE FIGURES

Other features and advantages will appear in the following detailed description made with respect to the appended drawings which represent:

FIG. 1: an example of a table of information that can be provided to the user of the system according to the invention;

DETAILED DESCRIPTION OF AT LEAST ONE EMBODIMENT

FIG. 1 shows a table reproducing an example of time-stamped events messages communicated to the user by virtue of the system according to the invention. The first column of the table lists the content of successive time-stamped events messages stored by the client software in a history; the second column relates to the time-stamping time associated with each time-stamped event message; the third column gives an indication of the time-stamping quality; the fourth column gives the topological identification of the time-stamping device responsible for the time-stamping for each of the messages; finally, the fifth column indicates the accuracy of the time-stamping and the sixth column lists the items of equipment at the source of each of the events. Clearly this table and the column headings that constitute it are given purely as an illustration and are non-limiting. In the example shown in FIG. 1, the marker indicating the quality of time-stamping can take the value OK or the value uncertain.

In the rest of the description, and in particular with respect to FIGS. 3 to 6, the means of the system making it possible to obtain the data to produce such a table will be explained.

Figure 2:
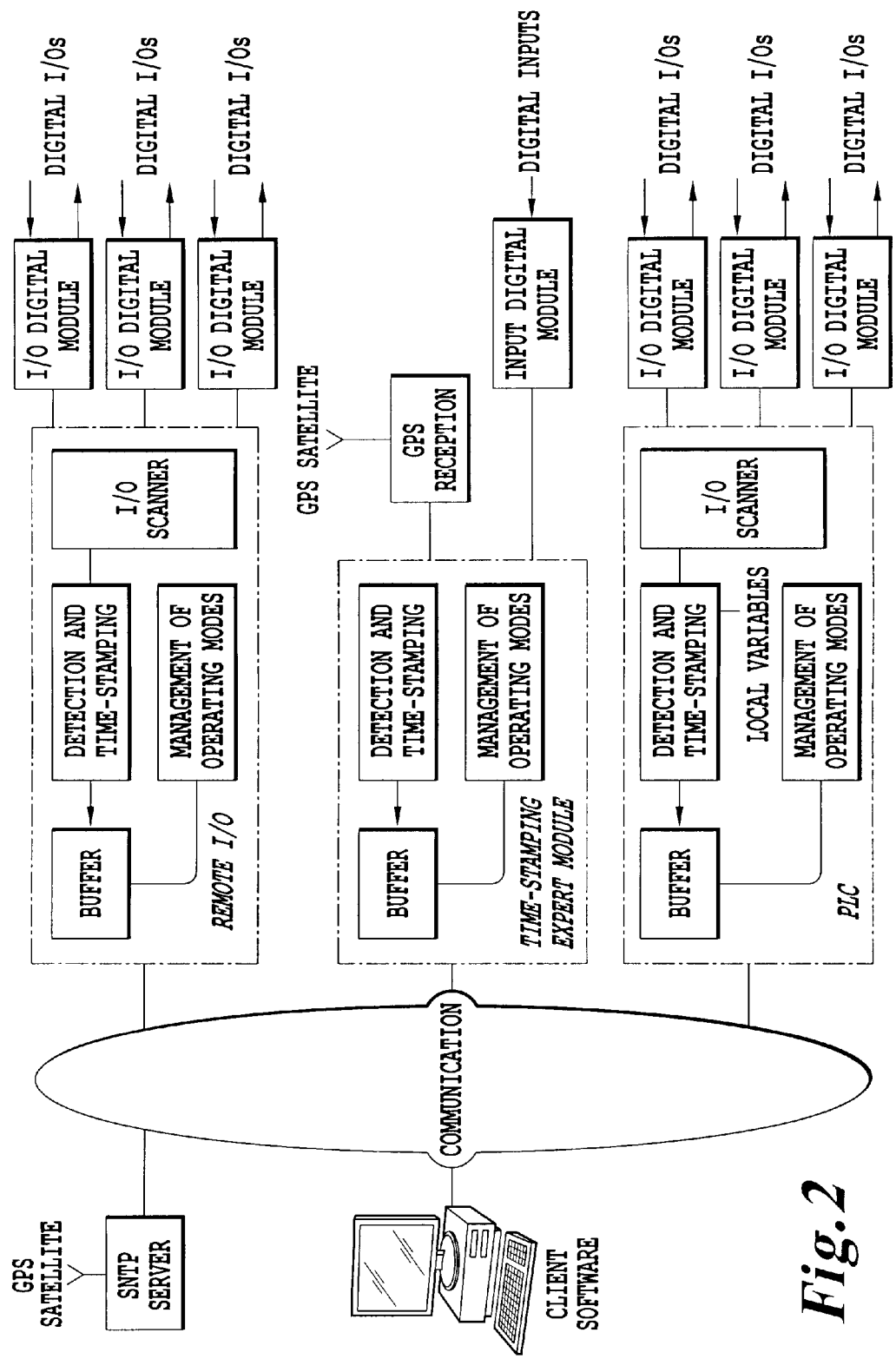
FIG. 2: an example of a system having a set of sources of events to be time-stamped.

FIG. 2 represents a diagram of an example of an events time-stamping distributed system to which the present invention relates. The user making use of the possibilities of the system according to the invention has "client software" connected via a "Communication" network to a distributed system of time-stamped events sources. The "Remote I/O" module, the "Time-Stamping Expert Module" and the "PLC", for Programmable Logical Controller, are all time-stamping devices. Each of these modules comprises "Detection and Time-Stamping" means for detecting and time-stamping any event occurring in the inputs/outputs (I/Os) associated with said modules. Each event detected and time-stamped is then saved in a unique "Buffer" by a time-stamping device, in each source of events to be time-stamped, that is to say in each module. Depending on their type, as shown in FIG. 2, these modules may comprise an "I/O Scanner" connected to various digital input/output modules—"I/O Digital Module" in FIG. 2—through which digital inputs/outputs of the system—"Digital I/Os" in FIG. 2—pass or be directly connected to an input digital module—"Input Digital Module" in FIG. 2—through which digital inputs—"Digital Inputs" in FIG. 2—of the system pass.

In FIG. 2, a reference time is given by the GPS, for global positioning system, satellite navigation system; this GPS time may be provided to the various time-stamping devices via an "SNTP server" and the "Communication" network or, more directly, via a "GPS reception" module.

FIGS. 3 to 6 show the principle of the invention in detail.

Figure 3:
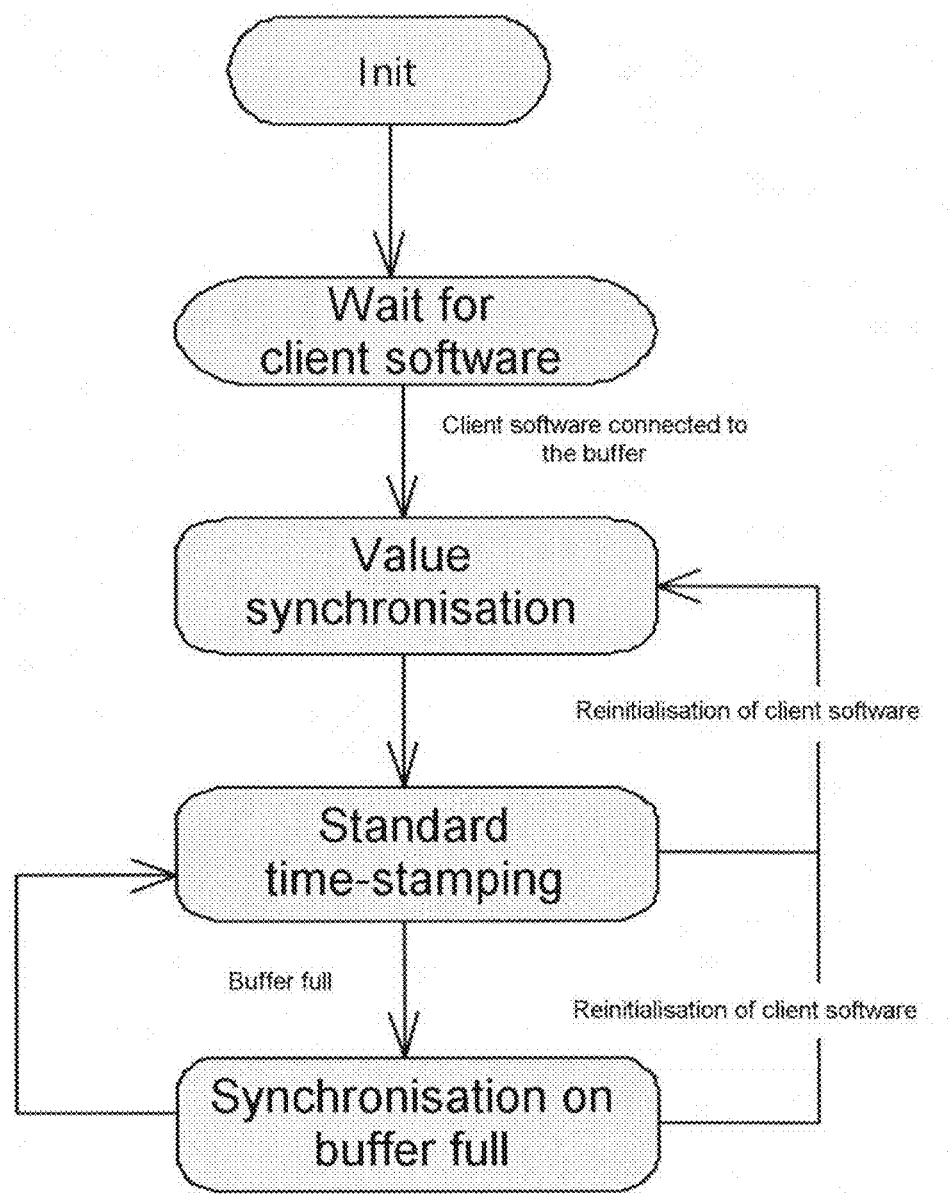
FIG. 3: a state diagram representing the overall operation of the system according to the invention.

FIG. 3 shows a global state machine representing the operation of the system according to the invention.

After an initialisation "Init" phase, the system waits for "client software" to connect to the buffer(s) of the system in order to read the time-stamped events that are or will be therein; when "client software" is capable of reading the buffer, a "Value synchronisation" function of the variables of a preconfigured list of variables—already mentioned above—is applied. This "Value synchronisation" function is explained in FIG. 4.

After complete application of said "Value synchronisation" function, the "Standard time-stamping" is carried out in a nominal manner, so long as a non-nominal operating mode does not occur. The "Standard time-stamping" of events is explained in FIG. 5.

Figure 6:
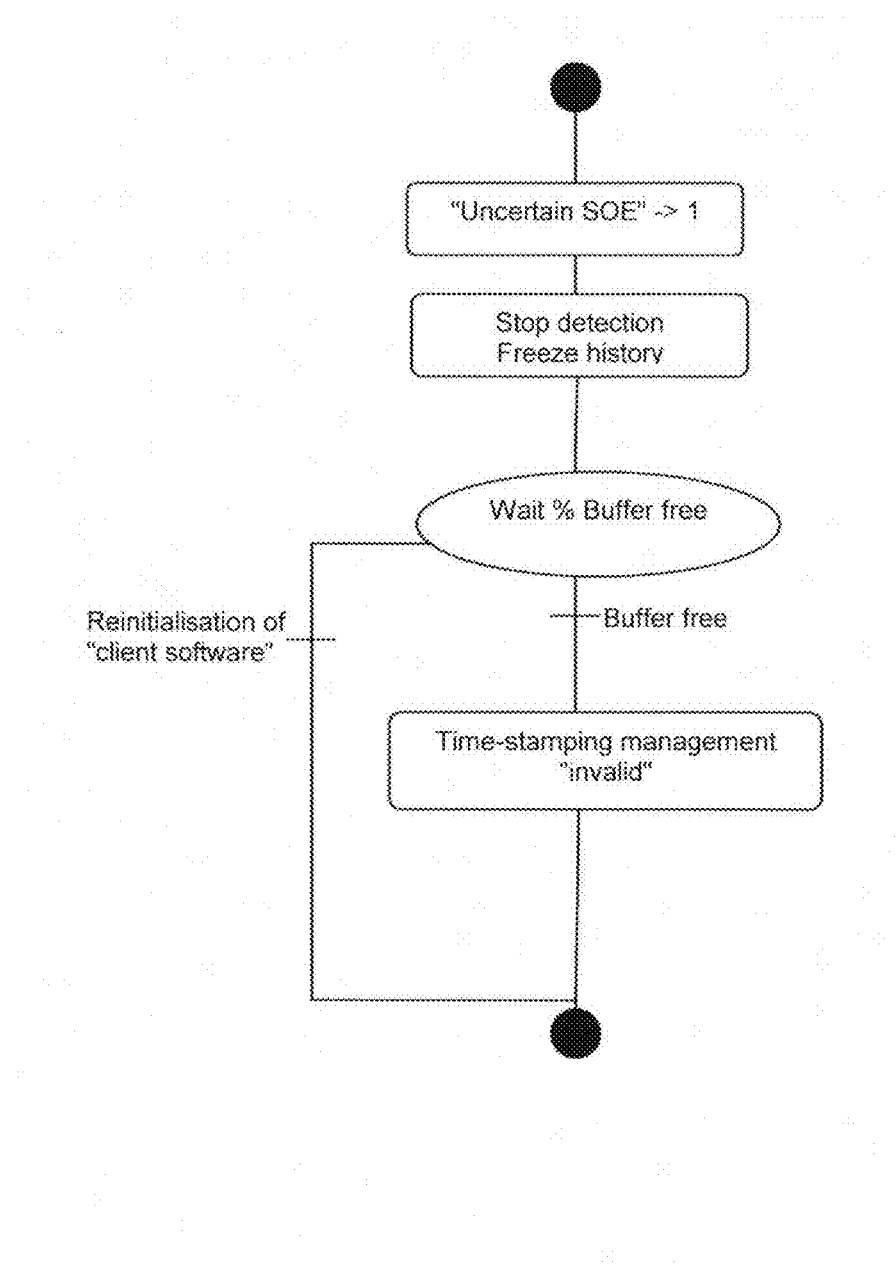
FIG. 6: a diagram representing the operation of the system according to the invention, in non-nominal operating mode because of a full buffer.

If a non-nominal operating mode is detected, in particular due to too great a buffer fill rate, that is to say exceeding a predefined fill threshold chosen by the user, or due to a reinitialisation of the "client software", the system suspends the standard time-stamping of events; in the event of a full buffer, the system applies the "Synchronisation on buffer full" function explained in FIG. 6. In the event of reinitialisation of the "client software" connected to the buffer, the system returns to applying the "Value synchronisation" function.

Figure 4:
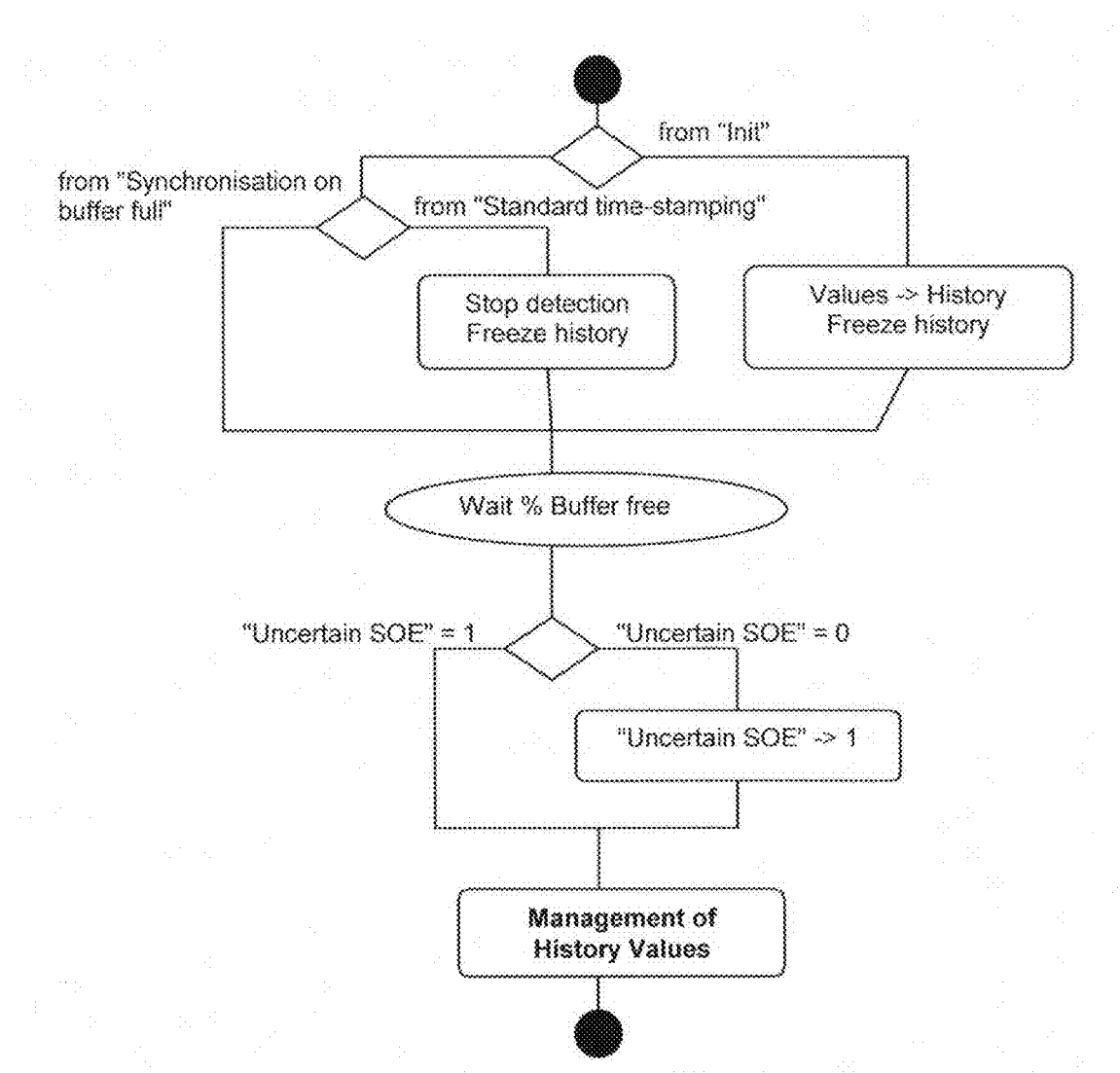
FIG. 4: a diagram representing the operation of the system according to the invention, in non-nominal operating mode because of initialisation of the system.

FIG. 4 shows a state machine explaining the "Value synchronisation" function. Its aim is to provide the values of the preconfigured variables to the client software.

It should be noted here that "history" means a list of the values of the variables of the preconfigured list that are saved in the previous detection cycle.

The "Value synchronisation" function can be applied:
after the "Init" phase for initialising the system and the connection of "client software" to the buffer of the system;
after reinitialisation of the "client software", while the "Standard time-stamping" function or else the "Synchronisation on buffer full" function was in use.

One of the innovative features of the invention lies in the fact that the system in question comprises a specific event of signalling an uncertain sequence of events. This event is called "Uncertain SOE" in FIGS. 1, 4, 5, 6. This specific event makes it possible to signal to the user of the system the beginning and the end of an uncertain sequence of events. For example, this specific event of signalling an uncertain sequence of events may be a Boolean set at 1 when the time-stamping is uncertain, and 0 when the time-stamping may be considered to be certain.

According to the embodiment of the invention shown in FIG. 4, when the "Value synchronisation" function is applied after the initialisation phase, the values of the variables corresponding to events that are present in the buffer are saved in the "History" by appropriate means. Then the "History" is frozen.

If the "Value synchronisation" function is applied after the reinitialisation of the "client software", originating from the "Synchronisation on buffer full" function or from the "Standard time-stamping" function, the system stops the detection of events, that is to say the detection of changes of value of variables of the list of variables in question, and freezes the "History" by appropriate means.

Then the system waits for the buffer to be partially freed up, because it has been read by the client software, in order to have the necessary room to store the values.

Then, the system indicates that the sequence of events that will follow is uncertain because it will consist of values and not of changes of values. For this, it sets the "Uncertain SOE" specific event to 1 if it was not already set to this value. All of the values of the variables saved in the history are stored in the buffer, associated for each variable with a marker indicating that the time-stamping of the corresponding events must be considered to be uncertain.

Figure 5:
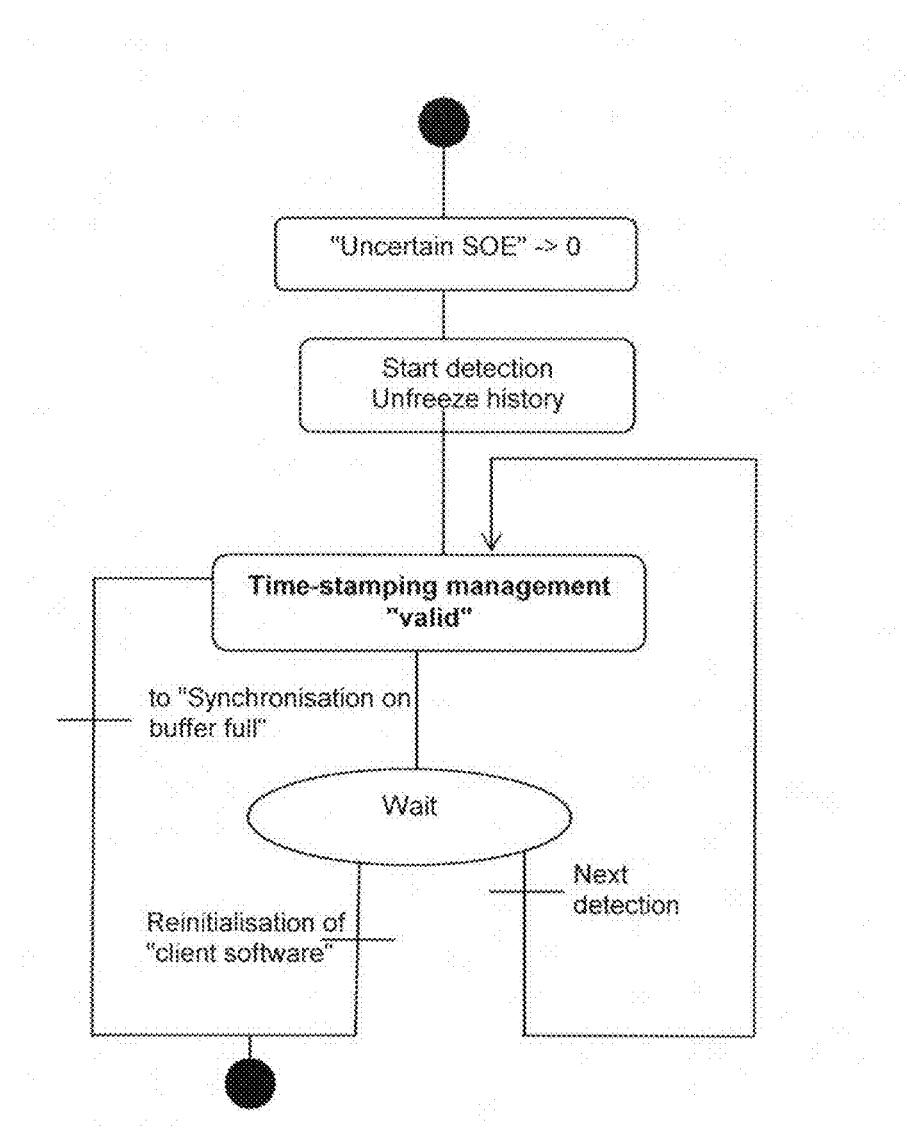
FIG. 5: a diagram representing the operation of the system according to the invention in "Standard time-stamping" events mode.

The system then applies the "Standard time-stamping" function described in FIG. 5. The "Standard time-stamping" is also applied after the "Synchronisation on buffer full" function described in FIG. 6 has been fully executed.

The "Standard time-stamping" function begins by signalling that the sequence of events that will follow is now reliable because it will consist of real changes of values. For this, it sets the "Uncertain SOE" event to 0. Then, the event-detection function will start and consequently the "History" is unfrozen.

Then, and this corresponds to a "Valid time-stamping management" function, for each variable of the preconfigured list of variables:
if the buffer is full, the system executes the "Synchronisation on full buffer" function;
if a reinitialisation of the "client software" is detected, the system executes the "Value synchronisation" function;
otherwise, when an event is detected reflecting a change of value of a variable of the preconfigured list of variables, the new value of said variable is stored in the buffer, associated with a marker indicating that the time-stamping of the corresponding event must be considered to be certain.

FIG. 6 describes the "Synchronisation on buffer full" function. The system executes this function from the "Standard time-stamping" function when the buffer is full. Its aim is to provide the client software with the transitions of values of the variables between the moment when the buffer is full and the moment when it has been partially freed up with sufficient space to store new values. This operation is necessary because, while the buffer is full, the values continue to change but the events can no longer be stored in the buffer and will therefore not be received by the client software. There is therefore no further consistency between the values on the time-stamped events source side and the values on the client software side.

The system indicates that the sequence of events that will follow is uncertain because it will consist of particular transitions and not of changes of standard values. It sets the "Uncertain SOE" event to 1.

Moreover, the detection of events is stopped, the "History" is frozen and the system waits for the buffer to be partially freed up, because it has been read by the client software, in order to have the necessary space to store the particular transitions.

When the buffer again has free space, the system verifies for each variable of the preconfigured list of variables whether its value has changed relative to the last value stored in the history when the buffer became full. If this is the case, the new value of each modified variable is saved in the buffer, associated with a marker indicating that the time-stamping of the corresponding events must be considered to be uncertain; this corresponds to an "Invalid time-stamping management" function.

Finally, if a reinitialisation of the "client software" is detected, the system applies the "Value synchronisation" function described in FIG. 4.

In summary, the system according to the invention has the advantage of having means for ensuring the consistency of the values and the chronology of the events in an intrinsic manner even in the event of non-nominal operations, for example if the buffer is full or if there is a reinitialisation of the client software responsible for reading the buffer or if there is a reinitialisation of the source of time-stamped events.

By virtue of the signalling of an uncertain sequence of events, the system according to the invention makes it possible to inform the user as soon as the time-stamping of events must be considered to be uncertain because it is not very accurate or because certain events of the sequence might have been lost.

Each source of events according to the invention comprises a unique buffer that it is capable of managing by intrinsic means; the presence of a unique buffer renders automatic the chronological filing of the detected events in said unique buffer.

The invention claimed is:
1. A system for managing time-stamped events with uncertain events-sequence signaling, comprising:
circuitry configured to:
detect and time-stamp said events corresponding to a of variables of which a change of value must lead to detection of an event to be time-stamped and to be saved;
for each variable, position a marker indicating the quality of the time-stamping of said event;
store in a buffer, before they are read by client software, said events to be time-stamped and to be saved, asso- ciated respectively with a time-stamping time, said time-stamped events read by the client software being erased from the buffer;

enable and disable saving in a history values of the variables corresponding to said time-stamped events that have been read;

detect a fill rate of said buffer exceeding a predefined fill threshold; and detect a presence of the client software connected to the buffer to read the events that are present in said buffer, wherein the circuitry is further configured to:

set a specific event signal of an uncertain sequence of events to 0 when the system must consider a sequence of subsequent events in the buffer to be valid, and to 1 when the system must consider the sequence of subsequent events in the buffer to be invalid, and wherein if the specific event signal of the uncertain sequence of events is set at 1, the marker indicating the quality of the time-stamping is set at an uncertain value.

2. The system according to claim 1, wherein said circuitry is configured to set said specific event signal of the uncertain sequence of events to the value 1 when the fill rate of the buffer becomes greater than or equal to the predefined fill threshold.

3. The system according to claim 1, wherein said circuitry is configured to not time-stamp an event when it detects no client software connected to the buffer to read the events that are present in said buffer.

4. The system according to claim 1, wherein said circuitry is configured to set said specific event signal of the uncertain sequence of events to the value 0 when client software is connected to the buffer to read the events that are present in said buffer and when the fill rate of the buffer becomes lower than the predefined fill threshold;

and wherein, if said specific event signal of the uncertain sequence of events is set at 0:

the circuitry is configured to enable saving in the history the values of the variables corresponding to the time-stamped events that have been read;

the circuitry is configured to detect and time-stamp the events corresponding to the list of variables; and the circuitry is configured to associate each new saving of a time-stamped event in the history with a marker indicating that the time-stamping of said time-stamped event is certain.

5. The system according to claim 4, wherein, if said specific event signal of the uncertain sequence of events is set at 0, said new saving of a time-stamped event is carried out only if the value of the corresponding variable has changed relative to the last value of the same variable that is present in the history.

6. The system according to claim 1, wherein, if the specific event signal of the uncertain sequence of events is set at 1:

the circuitry is configured to disable detecting events corresponding to the list of variables; and the circuitry is configured to disable saving in the history the values of the variables corresponding to the time-stamped events.

7. The system according to claim 6, wherein, if the specific event signal of the uncertain sequence of events is set at 1, and if an event that is present in the buffer is read by the client software and corresponds to a variable of which the value has changed relative to the last value of the same variable that is present in the history, said time-stamped event is saved in the history, associated with a marker indicating that the time-stamping of said time-stamped event is uncertain.

8. The system according to claim 1, wherein said buffer is the only buffer that is present in said system and the time-stamped events that are stored therein are sorted in an ascending chronological order of saving.

9. The system according to claim 1, wherein the circuitry is configured as a plurality of event sources, each of said event sources having a unique buffer.

* * * * *